US010909007B2

(12) United States Patent
Okamura et al.

(10) Patent No.: US 10,909,007 B2
(45) Date of Patent: Feb. 2, 2021

(54) STORAGE SYSTEM AND STORAGE CONTROL METHOD FOR REPLACING STORAGE CONTROLLERS IN A COMMUNICATION-DISABLED STATE DURING A SHUTDOWN-LESS REPLACEMENT

(71) Applicant: HITACHI, LTD., Tokyo (JP)

(72) Inventors: Naoya Okamura, Tokyo (JP); Masanori Fujii, Tokyo (JP); Naoki Moritoki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 108 days.

(21) Appl. No.: 16/330,333

(22) PCT Filed: Mar. 24, 2017

(86) PCT No.: PCT/JP2017/011970
§ 371 (c)(1),
(2) Date: Mar. 4, 2019

(87) PCT Pub. No.: WO2018/173246
PCT Pub. Date: Sep. 27, 2018

(65) Prior Publication Data
US 2019/0205226 A1 Jul. 4, 2019

(51) Int. Cl.
*G06F 11/00* (2006.01)
*G06F 11/20* (2006.01)
*G06F 3/06* (2006.01)
(52) U.S. Cl.
CPC .......... *G06F 11/201* (2013.01); *G06F 3/0617* (2013.01); *G06F 3/0635* (2013.01); *G06F 3/0689* (2013.01); *G06F 11/2017* (2013.01)

(58) Field of Classification Search
CPC ............... G06F 11/201; G06F 11/2017; G06F 11/2076; G06F 3/0617; G06F 3/0635; G06F 3/0689
See application file for complete search history.

(56) References Cited

U.S. PATENT DOCUMENTS 5,720,028 A   2/1998  Matsumoto et al.
6,412,068 B1* 6/2002  Nolan ................... G06F 11/201
                                                  710/1

(Continued)

FOREIGN PATENT DOCUMENTS

JP    08-335144 A      12/1996
JP    2001-290669 A    10/2001
WO    2016/088231 A1   6/2016

OTHER PUBLICATIONS

International Search Report dated Apr. 25, 2017 for the International Application No. PCT/JP2017/011970.

*Primary Examiner* — Elmira Mehrmanesh
(74) *Attorney, Agent, or Firm* — Volpe Koenig

(57) ABSTRACT

Provided are a storage system and a storage control method wherein, when communication is disabled (communication via a data communication path is disabled) in spite of replacement of a second CTL among a first CTL and the second CTL that are redundant storage controllers and that are coupled via the data communication path, the first CTL executes a write process of writing dirty data and data management information to one or more storage devices while maintaining acceptance of I/O requests from a host. The replaced second CTL reads the data management information from the one or more storage devices. The first CTL stops accepting I/O requests from the host. The replaced second CTL starts accepting I/O requests from the host.

9 Claims, 5 Drawing Sheets

(56) References Cited

U.S. PATENT DOCUMENTS

| | | | | |
|---|---|---|---|---|
| 6,578,158 B1* | 6/2003 | Deitz | ................... | G06F 11/2092 |
| | | | | 714/11 |
| 7,444,541 B2* | 10/2008 | Lubbers | .............. | G06F 11/2092 |
| | | | | 714/5.11 |
| 7,562,264 B2* | 7/2009 | Tangvald | ............ | G06F 11/1076 |
| | | | | 714/49 |
| 7,565,566 B2* | 7/2009 | Davies | ................... | G06F 11/201 |
| | | | | 714/4.5 |
| 7,600,157 B2* | 10/2009 | McAfee | .............. | G06F 11/2017 |
| | | | | 714/3 |
| 8,219,760 B2* | 7/2012 | Fukuda | ................. | G06F 3/0683 |
| | | | | 711/147 |
| 8,412,884 B1* | 4/2013 | Ide | ...................... | G06F 12/0871 |
| | | | | 711/113 |
| 8,443,119 B1* | 5/2013 | Limaye | ............... | G06F 11/2023 |
| | | | | 710/31 |
| 8,572,336 B2* | 10/2013 | Fujii | .................... | G06F 11/1666 |
| | | | | 711/159 |
| 9,130,869 B2* | 9/2015 | Manghirmalani | ...... | H04L 12/56 |
| 9,239,797 B2* | 1/2016 | Galbraith | ............ | G06F 11/2097 |
| 10,042,788 B2 | 8/2018 | Kotake et al. | | |
| 2005/0149637 A1* | 7/2005 | Fox | ...................... | H04Q 3/0062 |
| | | | | 710/5 |
| 2011/0035037 A1* | 2/2011 | Weber | ................. | B65G 47/5122 |
| | | | | 700/96 |
| 2011/0231683 A1* | 9/2011 | Kumasawa | ........... | G06F 3/0625 |
| | | | | 713/320 |
| 2013/0179595 A1* | 7/2013 | Chikusa | ................ | G06F 3/0613 |
| | | | | 710/2 |
| 2015/0355842 A1* | 12/2015 | Liu | ....................... | G06F 3/0604 |
| | | | | 711/103 |
| 2017/0185488 A1* | 6/2017 | Kumarasamy | ...... | G06F 11/1482 |
| 2017/0308486 A1* | 10/2017 | Kotake | .................. | G06F 3/061 |

* cited by examiner

STORAGE SYSTEM AND STORAGE CONTROL METHOD FOR REPLACING STORAGE CONTROLLERS IN A COMMUNICATION-DISABLED STATE DURING A SHUTDOWN-LESS REPLACEMENT

TECHNICAL FIELD

The present invention generally relates to storage control of a storage system having redundant storage controllers.

BACKGROUND ART

A storage system generally has one or more storage devices (typically, a RAID (Redundant Array of Independent (or Inexpensive) Disks) group constituted by a plurality of storage devices) and a storage controller (hereinafter, a CTL) which executes I/O (Input/Output) of data with respect to the one or more storage devices in response to an I/O request from a host. The CTL is made redundant in order to ensure reliability (for example, PTL 1).

CITATION LIST

Patent Literature

PTL 1: WO 2016/088231

SUMMARY OF INVENTION

Technical Problem

The redundant CTLs include first and second CTLs. Each CTL has an own memory. CTLs share information in memories between the CTLs and an inter-CTL synchronization process is executed between the CTLs. The synchronization process includes at least any one of inter-CTL communication of cached data (dirty data) in accordance with a write request received from the host and inter-CTL communication of management information (at least an updated portion thereof) which has been updated in accordance with the write request.

The CTLs are linked to each other by a data communication path. The inter-CTL communication for the synchronization process is performed via the data communication path.

Therefore, when communication via the data communication path is disabled (hereinafter, such a state is referred to as a "communication-disabled" state), the synchronization process between the CTLs is disabled (hereinafter, such a state is referred to as a "synchronization-disabled" state). With a storage system of which a system shutdown is desirably avoided to the greatest extent possible (for example, a storage system that is desirably operational 24 hours a day for 365 days a year), it is not desirable to suspend acceptance of I/O requests from a host because the CTLs are in a synchronization-disabled state.

However, when each CTL operates independently under a synchronization-disabled state, the system enters a state of a so-called split brain and problems such as loss of data inside a storage device may occur.

Therefore, when the CTLs are in a synchronization-disabled state, it is necessary to block one of the first and second CTLs and to continue operation by a single CTL.

Identification of a cause of a communication-disabled is not always possible. Thus, a method is always adopted in which the second CTL (a predetermined CTL) is blocked and replaced when the CTLS are in a communication-disabled state.

However, there may be cases where the CTLS become in a communication-disabled state by a failure of the first CTL (for example, a failure of a port to which the data communication path is coupled). Replacing the second CTL when the first CTL is in a failed state only results in an occurrence of a communication-disabled state and blockage of the second CTL. In this case, the first CTL may be replaced. However, it is unfortunately necessary to shut down the storage system for replacing the first CTL.

Solution to Problem

When a communication-disabled state (a state where communication via the data communication path is disabled) occurs even when the second CTL is replaced, the first CTL executes a write process of writing dirty data and data management information to one or more storage devices while maintaining acceptance of I/O requests from a host. The replaced second CTL reads the data management information from the one or more storage devices. The first CTL stops accepting I/O requests from the host. The replaced second CTL starts accepting I/O requests from the host.

Advantageous Effects of Invention

Even when it is a mistake to block the second CTL (a predetermined CTL), the first CTL (a CTL that is likely to be a failed CTL) can be blocked and replaced without shutting down the storage system.

DESCRIPTION OF EMBODIMENTS

Hereinafter, an embodiment will be described with reference to the drawings. In the following description, when describing elements of an identical or similar type without distinguishing the elements from one another, a common sign of reference signs may be used, but when describing elements of an identical or similar type by distinguishing the elements from one another, reference signs may be used. For example, when CTLs (storage controllers) are referred without distinguishing them from one another, the CTLs may be referred to as a "CTL 60", but when the CTLs are referred with distinguishing them from one another, the CTLs may be referred to as a "CTL 60A", a "CTL 60B", and the like. In addition, a symbol "A" will be used as a suffix of reference signs attached to components in the CTL 60A and a symbol "B" will be used as a suffix of reference signs attached to components in the CTL 60B.

Furthermore, in the following description, to "accept an I/O request" means a state where an I/O request is receivable and does not necessary mean that an I/O request has actually been received.

Figure 1:
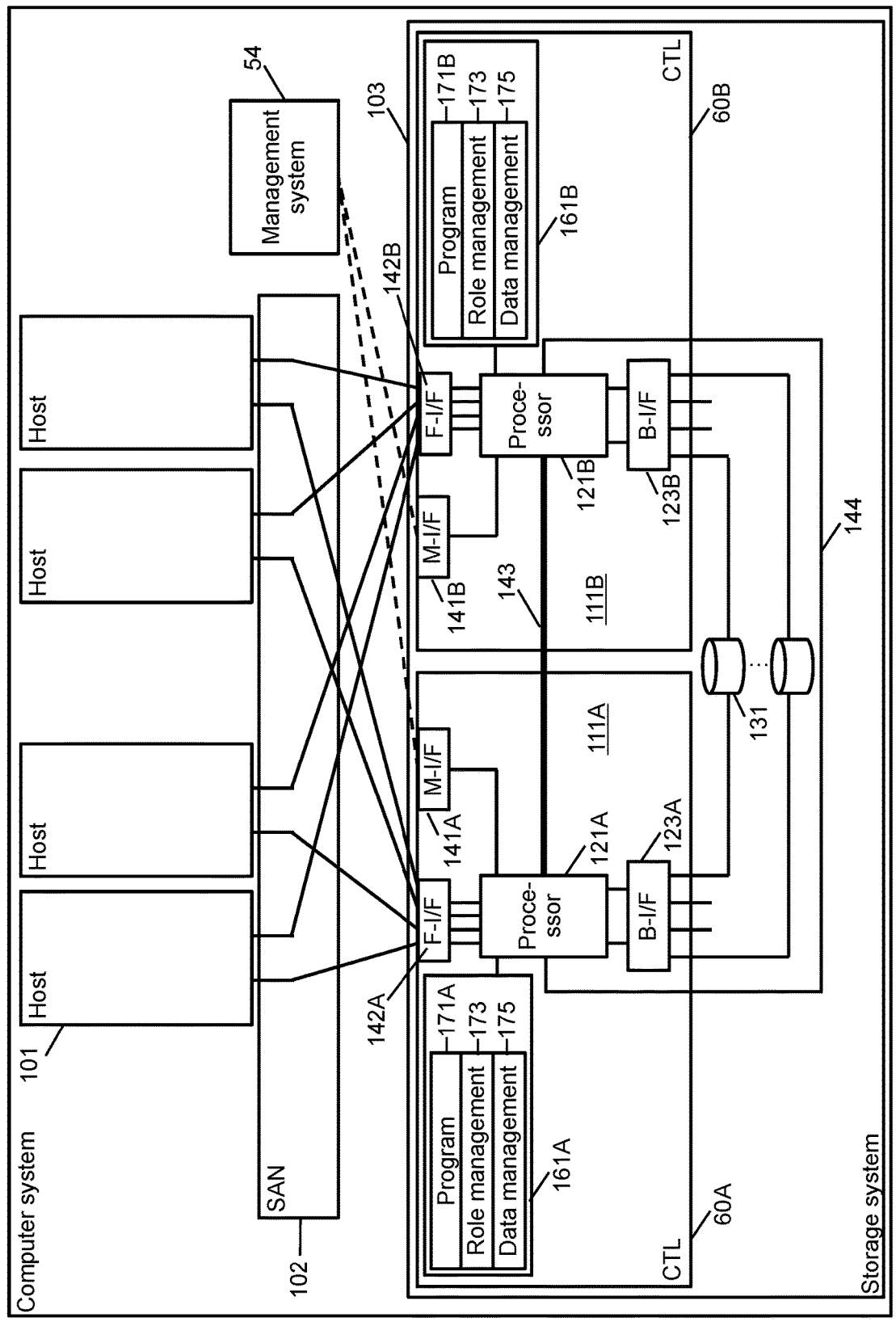
FIG. 1 shows a configuration of a computer system according to an embodiment.

FIG. 1 shows a configuration of a computer system according to an embodiment.

A computer system 50 includes a host storage system 52 and a management system 54. The host storage system 52 includes a plurality of hosts 101 and a storage system 103 coupled to the plurality of hosts 101. The management system 54 manages the storage system 103. The plurality of hosts 101 and the storage system 103 are coupled to each other via a first communication network such as a SAN (Storage Area Network) 102. The management system 54 and the storage system 103 are coupled to each other via a second communication network such as a LAN (Local Area Network). The first and second communication networks may be a same communication network. A relay device such as a PCIe (PCI-Express) switch or a multiplexor may be adopted in place of at least one of the first and second communication networks. There may be only one host 101. The host 101 is constituted by one or more host computers.

The storage system 103 includes: a plurality of storage devices 131; and redundant CTLs 60A and 60B which are coupled to the plurality of storage devices 131. The CTLs 60A and 60B are linked to each other by a data communication path 143 and a command communication path 144. There may be only one storage device 131.

For example, an outline of the present embodiment is as follows.

The CTL 60A is a master and the CTL 60B is a slave. When a first communication-disabled state occurs in which communication via the data communication path 143 is disabled, the CTL 60B (slave) is blocked and replaced. When a second communication-disabled state occurs in which communication via the data communication path 143 is disabled even after the CTL 60B is blocked and replaced (that is, when communication-disabled state is not resolved) or, in other words, when a selection of an CTL to be a block target was wrong (when a block selection error is detected), the replaced CTL 60B enters a hot standby mode while the CTL 60A enters a write through mode after confirming that the CTL 60B has entered the hot standby mode.

When the replaced CTL 60B enters the hot standby mode, the CTL 60B executes a preparation process including initial configuration for accepting I/O requests from the host 101.

When the CTL 60A enters the write through mode, the CTL 60A executes a write process of writing data management information 175 and dirty data (data that has been cached in a memory 161A but has not been written into the storage device 131) held by the CTL 60A into the storage device 131 while maintaining acceptance of I/O requests from the host 101.

The replaced CTL 60B reads the data management information from the storage device 131 to a memory 161B.

The CTL 60A exits the write through mode and stops accepting I/O requests from the host 101. The replaced CTL 60B starts accepting I/O requests from the host 101.

When the second communication-disabled state occurs, the data management information 175 is synchronized between the CTLs 60A and 60B via the storage device 131. Once the synchronization is completed and the CTL 60B starts accepting I/O requests, the CTL 60A is blocked (replacement of the CTL 60A is enabled).

According to the present embodiment, even when a block selection error occurs, the CTL 60A (the CTL that is likely to be a failed CTL) can be replaced without having to shut down the storage system 103.

Hereinafter, the present embodiment will be described in detail.

The host 101 transmits an I/O request of data (user data) to the storage system 103. User data refers to data stored by the host 101 in a logical volume. The I/O request includes I/O destination information representing an area of an I/O destination. The I/O destination information includes, for example, a LUN (Logical Unit Number) of a logical volume that is the I/O destination and an LBA (Logical Block Address) of an area in the logical volume. The logical volume is provided by the CTLs 60A and 60B.

A storage device 131 is a non-volatile storage device (for example, an HDD (Hard Disk Drive) or an SSD (Solid State Drive)).

The CTL 60 includes an F-I/F (a front end interface) 142, a B-I/F (a back end interface)123, an M-I/F (a management interface) 141, a memory 161, and a processor 121 connected to these components.

The F-I/F 142 is an interface device coupled to the plurality of hosts 101. The B-I/F 123 is an interface device coupled to the plurality of storage devices 131. The M-I/F 141 is an interface device coupled to the management system 54.

The memory 161 stores a control program 171, role management information 173, and data management information 175. The control program 171 is executed by the processor 121 and controls operations of the CTL 60. The role management information 173 is information indicating a role (a master or a slave) of each of the CTLs 60A and 60B. The data management information 175 is information related to data in accordance with a write request received by the CTL 60.

The CTLs 60A and 60B (for example, processors 121A and 121B) are linked to each other by the data communication path 143. In addition, the CTLs 60A and 60B (for example, the processors 121A and 121B) are linked to each other by the command communication path 144.

The management system 54 is constituted by one or more computers. For example, when a management computer displays information (specifically, when a management computer displays information on its own display device or when a management computer transmits information to be displayed to a remote display computer), the management computer constitutes the management system 54. In addition, for example, when functions identical or similar to those of a management computer are realized by a plurality of computers, the plurality of computers (when a display computer performs display, the display computer may be included therein) constitute the management system 54. Input of information to the computer and output of information from the computer may be performed by an input/output device included in the computer. While a display device, a keyboard, and a pointing device are conceivable as examples of the input/output device, other devices may be adopted in place of at least one of these devices or in addition to these devices. In addition, a serial interface device or an Ethernet input/output device (Ethernet is a registered trademark) may be adopted as an alternative to the input/output device, in which case output (for example, display) and input of information may be performed by coupling a display computer including a display device, a keyboard, and a pointing device to such an interface device and by having a computer transmit information to be displayed to the display computer and having the computer receive information to be input from the display computer.

Figure 2:
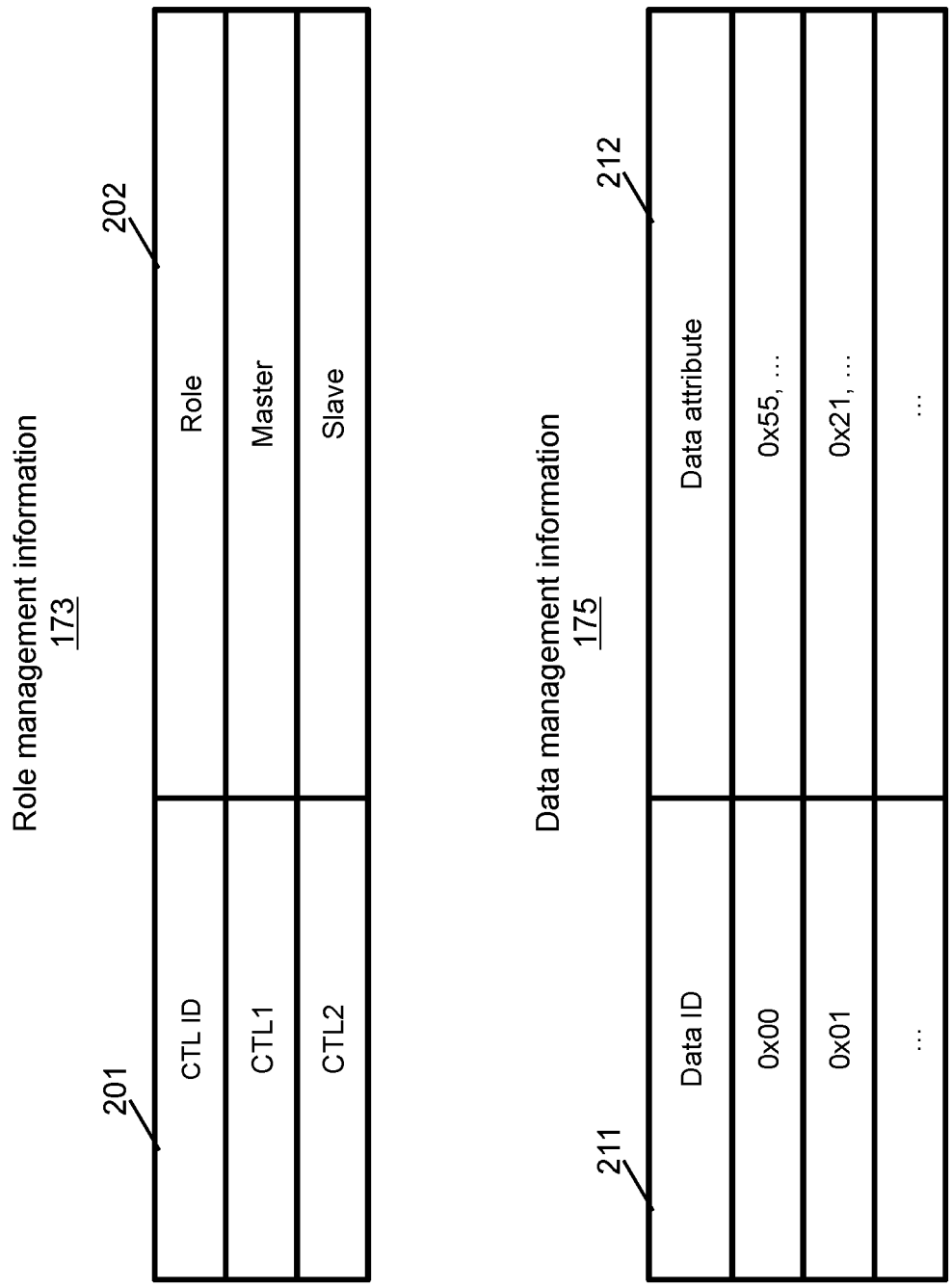
FIG. 2 shows respective configurations of role management information and data management information.

FIG. 2 shows respective configurations of the role management information 173 and the data management information 175.

The role management information 173 has an entry for each CTL 60 and each entry holds information such as a CTL ID 201 and a role 202. The CTL ID 201 is an ID of the CTL 60. The role 202 indicates a role of the CTL 60. According to the present embodiment, prior to an occurrence of the second communication-disabled state, the CTL 60A (CTL ID 201 "CTL1") is a master and the CTL 60B (CTL ID 201 "CTL2") is a slave.

The data management information 175 has an entry for each piece of data (user data). Each entry holds information such as a data ID 211 and a data attribute 212. The data ID 211 is an ID of a piece of data (user data). The data attribute 212 includes information related to an attribute of the piece of data such as a storage area address (for example, an ID of the storage device 131 and an address of a storage area in the storage device 131) of the piece of data. The data attribute 212 may further include at least one of a volume area address (for example, an address of an area in a logical volume) of the piece of data, a cache attribute (for example, dirty (the piece of data is not stored in the storage device 131) or clean (the data piece of is stored in the storage device 131)) of the piece of data, and a cache area address (for example, an address of an area of the piece of data in the memory 161) of the piece of data.

Hereinafter, an example of processes performed in the present embodiment will be described.

Figure 3:
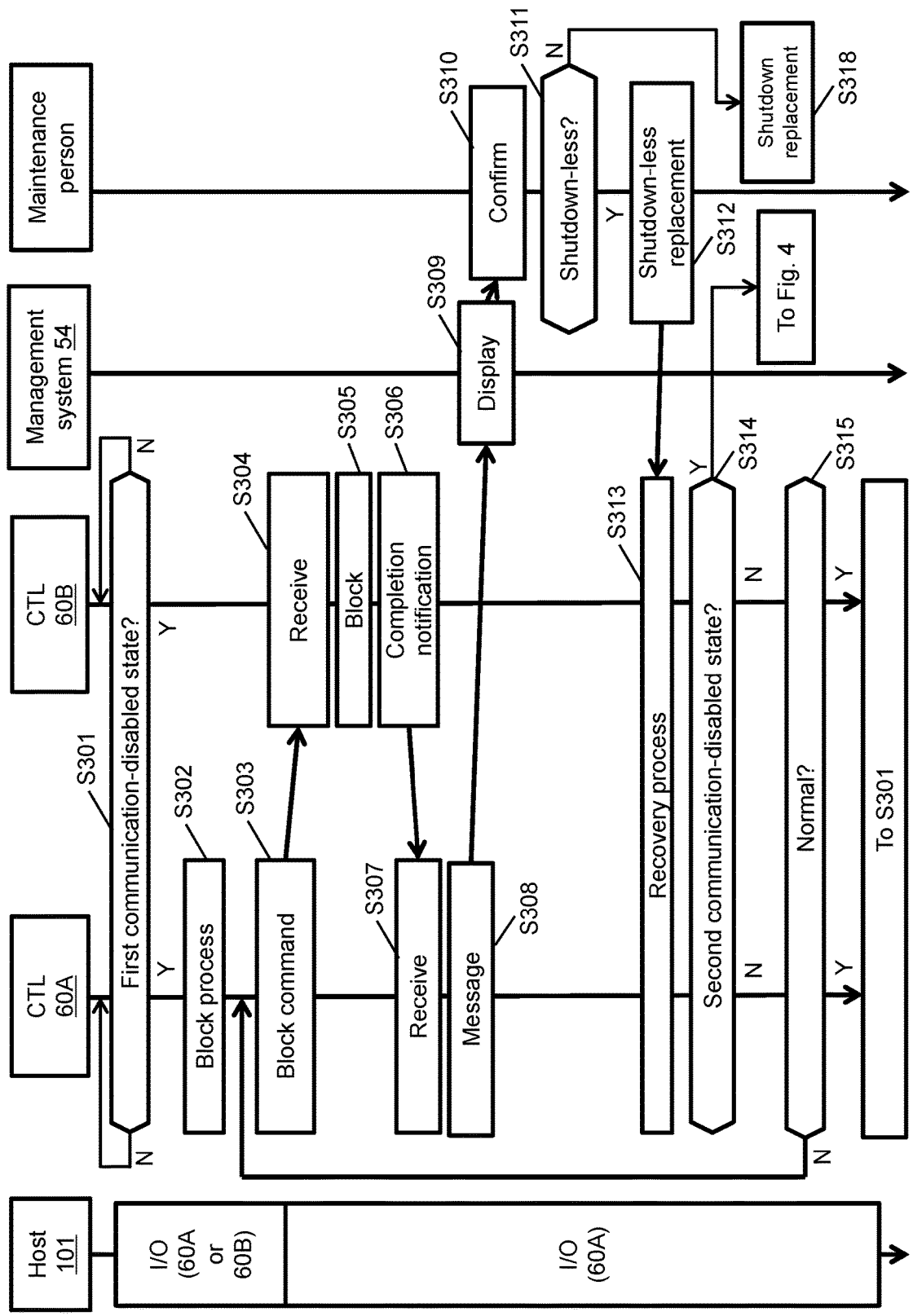
FIG. 3 shows a part of a flow of process that is executed when first and second communication-disabled states occur.
Figure 4:
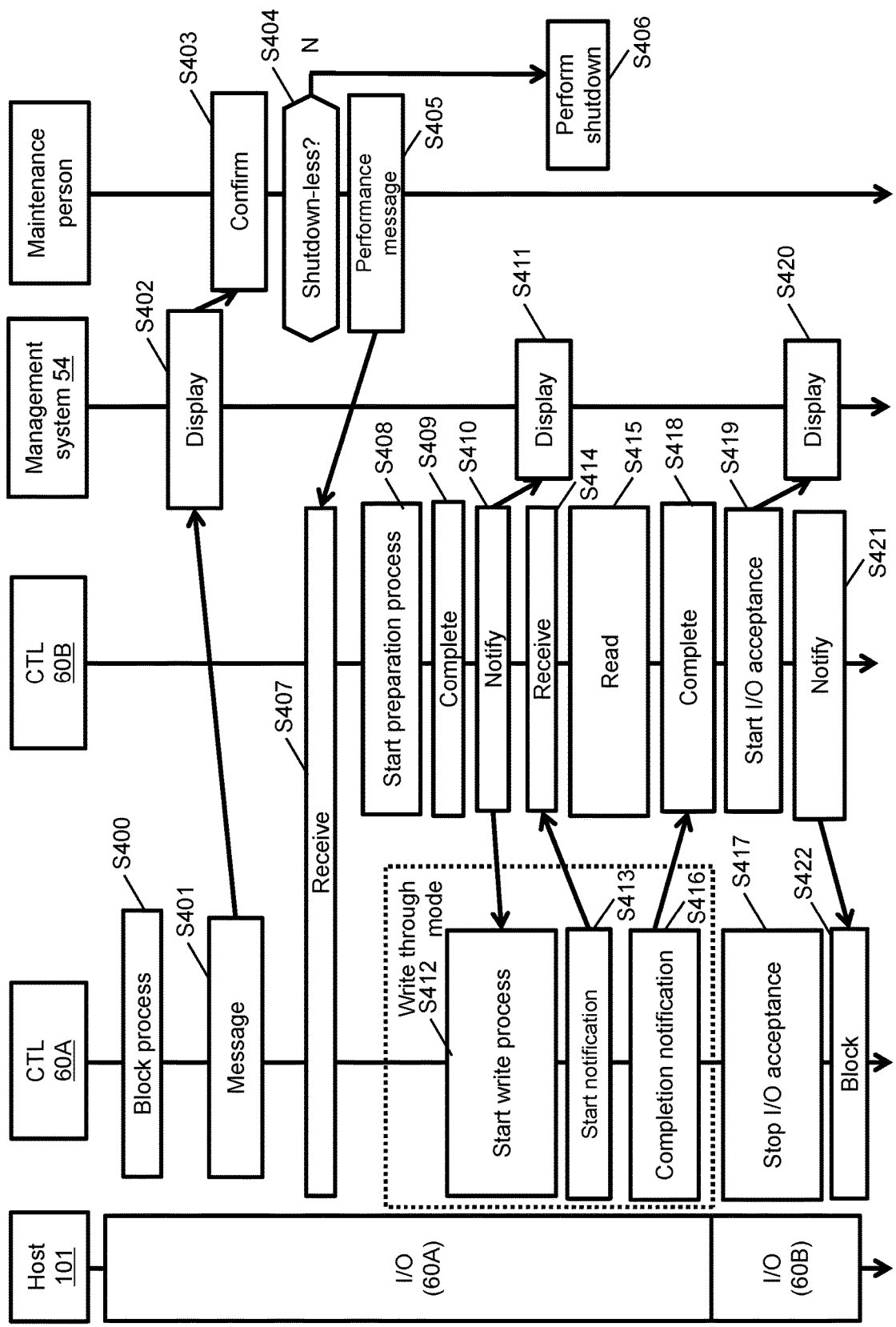
FIG. 4 shows a remainder of the flow of process that is executed when first and second communication-disabled states occur.

FIGS. 3 and 4 show a flow of the processes that are executed when the first and second communication-disabled states occurs. In the following description, a process of the CTL 60A is a process that is performed by, for example, the processor 121A executing a control program 171A. In addition, a process of the CTL 60B is a process that is performed by, for example, the processor 121B executing a control program 171B.

When a first communication-disabled state occurs in which communication via the data communication path 143 is disabled (S301: Y), the CTL 60A executes a block process of the first communication-disabled state (for example, a process of shutting down modules (for example, the F-I/F 142A and the B-I/F 123A) coupled to the processor 121A)) (S302). And then the CTL 60A transmits a block command (an example of a first signal) to the CTL 60B via the command communication path 144 (S303). S302 and S303 are executed by the CTL 60A because the CTL 60A is the master. The CTL 60B receives the block command via the command communication path 144 (S304) and blocks itself in response to the block command (S305). In addition, the management system 54 may be notified of the occurrence of the first communication-disabled state from the CTL 60A (or 60B) and the CTL 60B may receive a block command from the management system 54 having received the notification. Both the CTLs 60A and 60B accept I/O requests from the host 101 until the CTL 60B receives the block command, but only the CTL 60A accepts I/O requests from the host 101 after the CTL 60B receives the block command. Once the CTL 60B is blocked, the CTL 60B transmits a block completion notification to the CTL 60A via the command communication path 144 (S306).

The CTL 60A receives the block completion notification via the command communication path 144 (S307) and transmits a block completion message to the management system 54 via the M-I/F 141A (S308). The management system 54 receives the block completion message and displays contents of the message (S309). A maintenance person checks the message contents (S310) and determines whether or not to perform a shutdown-less replacement of the CTL 60B (S311). A "shutdown-less replacement" refers to replacing the CTL 60 without shutting down the storage system 103 (in a state where the storage system 103 remains operational). When a determination result of S311 is false, the maintenance person performs a shutdown replacement of the CTL 60B. A "shutdown replacement" refers to replacing the CTL 60 after shutting down the storage system 103.

When the determination result of S311 is true, the maintenance person performs a shutdown-less replacement of the CTL 60B and, transmits a completion notification to at least one of the CTL 60A and the replaced CTL 60B via the management system 54 (S312). When one of the CTL 60A and the replaced CTL 60B receives the completion notification, the completion notification is shared between the CTLs 60A and 60B via the command communication path 144.

The CTL 60A and the replaced CTL 60B receive the completion notification and execute a recovery process. In the recovery process, for example, (1) to (4) below are performed.

(1) The processor 121B in the CTL 60B starts and initializes the CTL 60B.
(2) The processor 121B diagnoses whether or not modules in the CTL 60B are normal.
(3) When the modules in the CTL 60B are normal, the processor 121B performs, with the processor 121A in the CTL 60A, initial configuration with respect to inter-CTL communication.
(4) The processor 121B performs, with the processor 121A in the CTL 60A, a synchronization process of the data management information 175.

When a second communication-disabled state occurs in which communication via the data communication path 143 is disabled even after the CTL 60B is replaced (S314: Y) or, in other words, when a block selection error occurs, a process shown in FIG. 4 is executed. When the storage system 103 is not restored to normal even though the second communication-disabled state does not occur (S315: N), S303 is executed once again. When the storage system 103 is restored to normal (S315: Y), the process returns to S301.

Figure 5:
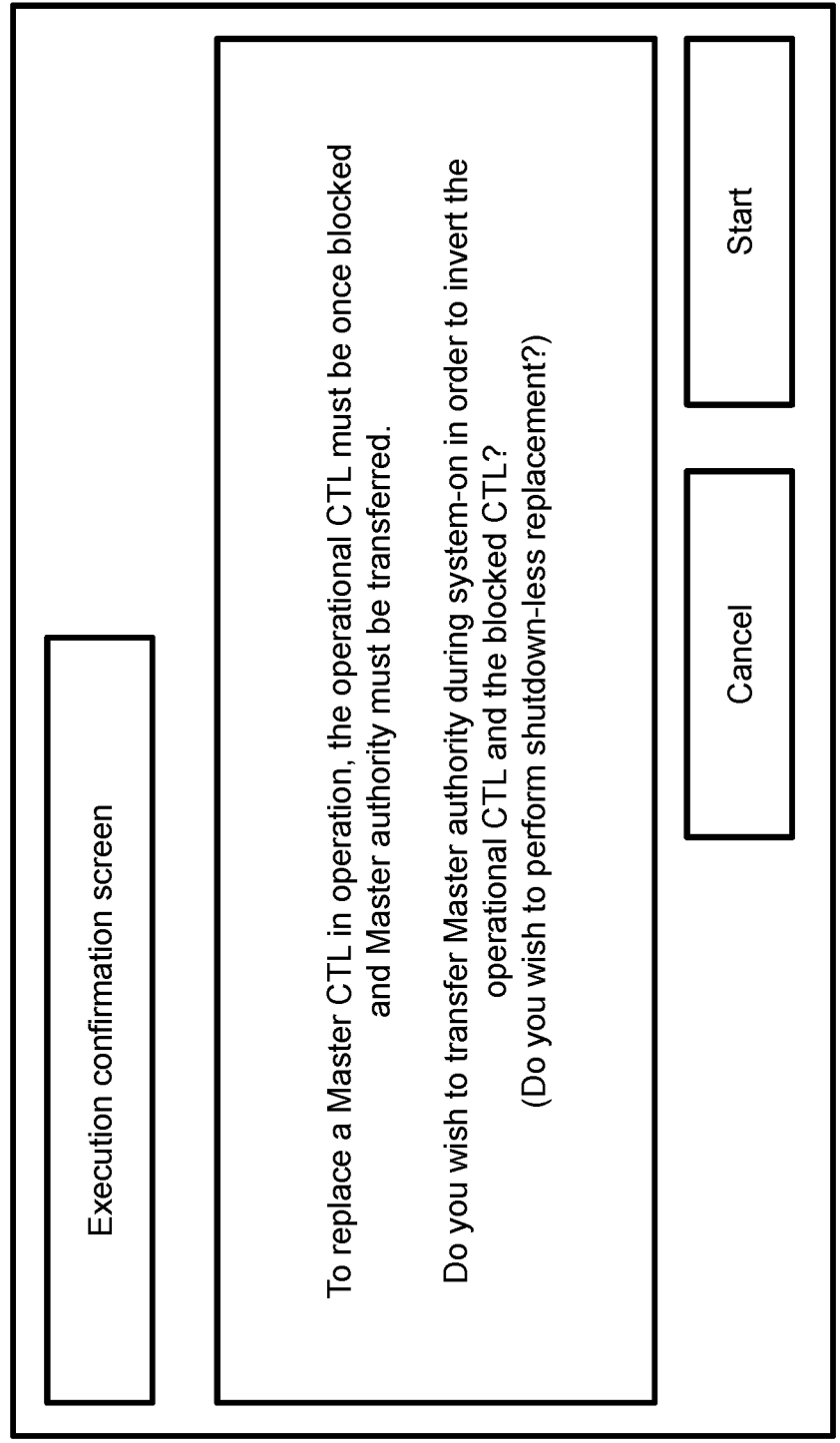
FIG. 5 shows an example of a screen displayed by a management system when a second communication-disabled state occurs.

When a block selection error occurs, as shown in FIG. 4, the CTL 60A executes a block process of the second communication-disabled state (S400). The CTL 60A transmits a confirmation message including an inquiry as to whether or not a shutdown-less replacement of the CTL 60A is to be performed to the management system 54 (S401). The management system 54 receives the confirmation message and displays the confirmation message (S402). FIG. 5 shows an example of a display screen of the confirmation message. The maintenance person checks the confirmation message (S403) and determines whether or not to perform a shutdown-less replacement of the CTL 60A (S404). When a determination result of S404 is false, the maintenance person performs a shutdown replacement of the CTL 60A (S406). S406 is performed when, for example, a "cancel" button on the display screen exemplified in FIG. 5 is pressed.

When the determination result of S404 is true, a performance message (an example of a third signal) including information describing that a shutdown-less replacement of the CTL 60A is to be performed is transmitted to at least one of the CTL 60A and the replaced CTL 60B via the management system 54 (S405). S405 is performed when, for example, a "start" button on the display screen exemplified in FIG. 5 is pressed. When one of the CTL 60A and the replaced CTL 60B receives the performance message, the performance message is shared between the CTLs 60A and 60B via the command communication path 144.

The CTL 60A and the replaced CTL 60B receive the performance message (S407), and the CTL 60B enters the hot standby mode. Specifically, the CTL 60B starts a preparation process including initial configuration for accepting I/O requests from the host (S408). Alternatively, S408 may be started after S400 by skipping S401 to S407. In other words, S408 may be started without a manual instruction from the maintenance person. The CTL 60B completes the preparation process (S409) and transmits a completion notification to at least the CTL 60A among the management system 54 and the CTL 60A. The management system 54 having received the completion notification displays a completion notification message (S411).

The replaced CTL 60B completing the preparation process means that once inheritance from the CTL 60A to the CTL 60B is completed, the CTL 60B becomes capable of accepting I/O requests. In consideration thereof, the CTL 60A having received the completion notification (in other words, the CTL 60A having confirmed that the CTL 60B has entered the hot standby mode) enters the write through mode or, in other words, the CTL 60A having received the completion notification starts a write process of writing dirty data and data management information in the memory 161A into one or more storage devices 131 while maintaining acceptance of I/O requests from the host 101 (S412). An address of a storage area that is a write destination of the data management information may be determined in advance. The CTL 60A transmits a write process start notification (an example of a second signal) to the CTL 60B via the command communication path 144 (S413). The CTL 60B receives the write process start notification (an example of a second signal) via the command communication path 144 (S414). The write process start notification may designate an address of a storage area that is a write destination of the data management information. When the CTL 60B receives the write process start notification, the CTL 60B reads the data management information from the one or more storage devices 131 and starts an inheritance process (for example, inheritance of information related to a blocked storage device 131) (S415). Reading the data management information from the one or more storage devices 131 may or may not be included in the inheritance process.

In the write through mode, when the CTL 60A receives a write request from the host 101, the CTL 60A writes data in accordance with the write request into one or more storage devices 131 and, updates the data management information in the one or more storage devices 131 in accordance with the writing of the data and subsequently responds to the host 101 with a write completion. In this manner, when the CTL 60A receives a write request in the write through mode, a response is returned after writing data in accordance with the write request and an update of the data management information are executed with respect to one or more storage devices 131. Accordingly, it is expected that accuracy of inheritance of the data management information to the CTL 60B can be guaranteed.

When the CTL 60A completes the write process, the CTL 60A transmits a write process completion notification (an example of a fourth signal) to the CTL 60B via the command communication path 144 (S416). The CTL 60A stops acceptance of I/O requests (S417). In doing so, the CTL 60A changes the role of the CTL 60A from a master to a slave (updates the role management information 173).

The CTL 60B receives the write process completion notification via the command communication path 144 or, in other words, the CTL 60B completes the inheritance process (S418). In this case, the CTL 60B starts acceptance of I/O requests (S419). In doing so, the CTL 60B changes the role of the CTL 60B from a slave to a master (updates the role management information 173). In addition, the CTL 60B transmits a notification of the start of I/O acceptance by the CTL 60B to the management system 54. The management system 54 having received the notification displays a message including information indicating that the CTL 60B has started I/O acceptance (S420). Since the CTL 60B becomes a master in S419, subsequently, when communication-disabled state occurs after the CTL 60A is replaced, the CTL 60B is capable of blocking the CTL 60A. The CTL 60B becomes a master on a temporary basis and, after the CTL 60A is replaced, the CTL 60A may become a master and the CTL 60B may be restored to a slave.

The CTL 60A accepts I/O requests until S416 and S418, and the CTL 60B accepts I/O requests on behalf of the CTL 60A from S417 and S419. The stopping of I/O request acceptance of S417 maintains conformance between the data management information read by the CTL 60B to the memory 161B and the data management information in the one or more storage devices 131.

As described above, when the second communication-disabled state occurs, since the performance message and the write process start notification described above are received instead of a block command, the CTL 60B can be prevented from being blocked.

After S419, the CTL 60B returns a write completion notification confirmation response (an example of a fifth signal) to the CTL 60A via the command communication path 144 (S421). When the CTL 60A receives the confirmation response, the CTL 60A blocks itself (S422). The CTL 60A receiving the write completion notification confirmation response corresponds to the CTL 60A becoming cognizant of the fact that the CTL 60B has started acceptance of I/O requests. Since the CTL 60A is blocked in such a case, at least one CTL 60 can be guaranteed to accept I/O requests.

In addition, while the exchanges between the CTLs 60A and 60B in the processes shown in FIGS. 3 and 4 may be performed via the management system 54, by performing the exchanges via the command communication path 144, faster exchanges than those performed via the management system 54 can be expected.

In addition, whether or not to perform a shutdown-less replacement of the CTL 60A when the second communication-disabled state occurs is determined by the maintenance person. Accordingly, a situation where the CTL 60A enters a block state without confirmation by the maintenance person can be avoided.

While several embodiments have been described above, it is to be understood that the described embodiments merely represent examples for illustrating the present invention and that the scope of the present invention is not limited to the embodiments. The present invention can also be implemented in various other modes. For example, in the data management information 175, the data attribute 212 may include at least one of an I/O frequency and a final I/O time point. After starting I/O acceptance, the CTL 60B may predict, in the background (in other words, regardless of whether or not an I/O request is accepted), data with a high read probability based on at least one of the I/O frequency and the final I/O time point in each entry and cache the predicted data from the storage device 131 to the memory 161B. Accordingly, an improvement in read performance can be expected.

REFERENCE SIGNS LIST

103 Storage system

The invention claimed is:

1. A storage system configured to be coupled to a host that issues I/O (Input/Output) requests, the storage system comprising:
   one or more storage devices;
   first and second storage controllers which are redundant storage controllers and which are configured to be coupled to the host and the one or more storage devices; and
   a data communication path which is coupled to the first and second storage controllers, wherein
   the first storage controller includes a first memory in which data in accordance with a write request received by the first storage controller is cached,
   the second storage controller includes a second memory in which data in accordance with a write request received by the second storage controller is cached,
   each of the first and second memories is configured to store data management information which is management information related to data to be written into the one or more storage devices in response to a write request,
   the data communication path is a path used in order to synchronize at least one of dirty data and a management information update portion between the first and second storage controllers,
   the dirty data is data not yet written into the one or more storage devices from a memory,
   the management information update portion is at least a portion which is updated in accordance with a write request in the data management information,
   the second storage controller is blocked and replaced when a first communication-disabled state occurs in which communication via the data communication path is disabled,
   when a second communication-disabled state occurs in which communication via the data communication path is disabled even after the second storage controller is replaced,
      (A) the first storage controller is configured to execute a write process of writing dirty data and data management information in the first memory into the one or more storage devices while maintaining acceptance of I/O requests from the host;
      (B) the replaced second storage controller is configured to read the data management information from the one or more storage devices to the second memory;
      (C) the first storage controller is configured to stop accepting I/O requests from the host; and
      (D) the replaced second storage controller is configured to start accepting I/O requests from the host,
   the second storage controller is configured to receive, when the first communication-disabled state occurs, a first signal which causes blockage of the second storage controller, and
   the replaced second storage controller is configured to receive, when the second communication-disabled state occurs, a second signal which causes the data management information to be read from the one or more storage devices to the second memory instead of the first signal.

2. The storage system according to claim 1, further comprising
   a command communication path which is coupled to the first and second storage controllers, wherein
   the command communication path is a path used to transmit and receive control commands between the first and second storage controllers, and
   the second storage controller is configured to receive the first signal and the second signal from the first storage controller via the command communication path.

3. The storage system according to claim 2, wherein
   the replaced second storage controller is configured to:
   execute a preparation process including initial configuration for accepting I/O requests from the host; and
   transmit, after completion of the preparation process, a third signal to the first storage controller via the command communication path, and
   the first storage controller is configured to, when receiving the third signal, start the write process and transmit the second signal to the second storage controller via the command communication path when the second communication-disabled state occurs.

4. The storage system according to claim 3, wherein
   the first storage controller is configured to, after completion of the write process, transmit a fourth signal to the second storage controller via the command communication path and execute the (C), and
   the second storage controller is configured to execute the (D) after receiving the fourth signal.

5. The storage system according to claim 4, wherein
   the second storage controller is configured to transmit a fifth signal to the first storage controller via the command communication path when (D) is executed, and
   the first storage controller is configured to block itself when receiving the fifth signal.

6. The storage system according to claim 2, wherein
   prior to the occurrence of the second communication-disabled state,
      the first storage controller has a role of a master configured to transmit the first signal for blocking a storage controller having a role as a slave when the first communication-disabled state occurs, and
      the second storage controller has a role as a slave,
   the (C) corresponds to a stop of the role as a master of the first storage controller, and
   the (D) corresponds to a start of the role as a master of the replaced second storage controller.

7. The storage system according to claim 1, wherein
   the first storage controller and the replaced second storage controller are coupled to a management system of the storage system, and
   when the second communication-disabled state occurs,
      the first storage controller is configured to transmit a first message to the management system, and
      the (A) is started when at least one of the first storage controller and the replaced second storage controller receives a second message from the management system which received the first message.

8. The storage system according to claim 1, wherein in the (A), the first storage controller is configured to write, when receiving a write request from the host, data in accordance with the write request into the one or more storage devices and update the data management information in the one or more storage devices in accordance with the writing of data and subsequently respond to the host with a write completion.

9. A storage control method of a storage system including first and second storage controllers which are redundant storage controllers and which are coupled to a host that issues I/O (Input/Output) requests and to one or more storage devices, the method comprising:

blocking and replacing the second controller when a first communication-disabled state occurs in which communication via a data communication path is disabled, the data communication path being a path connected to the first and second storage controllers, the first storage controller including a first memory in which data in accordance with a write request received by the first storage controller is cached, the second storage controller including a second memory in which data in accordance with a write request received by the second storage controller is cached, each of the first and second memories storing data management information which is management information related to data to be written into the one or more storage devices in response to a write request, the data communication path being a path used in order to synchronize at least one of dirty data and a management information update portion between the first and second storage controllers, the dirty data being data not yet written into the one or more storage devices from a memory, the management information update portion being at least a portion which is updated in accordance with a write request in the data management information, when a second communication-disabled state occurs in which communication via the data communication path is disabled even after the second storage controller is replaced:

(A) the first storage controller executing a write process of writing dirty data and data management information in the first memory into the one or more storage devices while maintaining acceptance of I/O requests from the host;

(B) the replaced second storage controller reading the data management information from the one or more storage devices to the second memory;

(C) the first storage controller stopping accepting I/O requests from the host; and (D) the replaced second storage controller starting accepting I/O requests from the host, the second storage controller is configured to receive, when the first communication-disabled state occurs, a first signal which causes blockage of the second storage controller, and the replaced second storage controller is configured to receive, when the second communication-disabled state occurs, a second signal which causes the data management information to be read from the one or more storage devices to the second memory instead of the first signal.

* * * * *